R. S. SMITH.
ROLLER BEARING.
APPLICATION FILED APR. 23, 1913.

1,078,667. Patented Sept. 9, 1913.

Witnesses:
Fred Palm
Chas. L. Goss

Inventor:
Reuben S. Smith
By Flanders Bottum, Trossett & Bottum
Attorneys.

UNITED STATES PATENT OFFICE.

REUBEN S. SMITH, OF MILWAUKEE, WISCONSIN.

ROLLER-BEARING.

1,072,667.

Specification of Letters Patent.  Patented Sept. 9, 1913.

Application filed April 28, 1913. Serial No. 764,028.

*To all whom it may concern:*

Be it known that I, REUBEN S. SMITH, a citizen of the United States, residing at Milwaukee, in the county of Milwaukee and State of Wisconsin, have invented certain new and useful Improvements in Roller-Bearings, of which the following is a specification, reference being had to the accompanying drawing, forming a part thereof.

This invention relates more particularly to combined end thrust and radial load bearings.

The main objects of the invention are to avoid the tendency to longitudinal displacement incident to the use of conical or tapering rollers; to avoid the slippage, friction and wear incident to the operation of long cylindrical rollers between conical bearings; and generally to improve the construction and operation of roller bearings of this class.

In the accompanying drawing like characters designate the same parts in the several figures.

Figure 1:
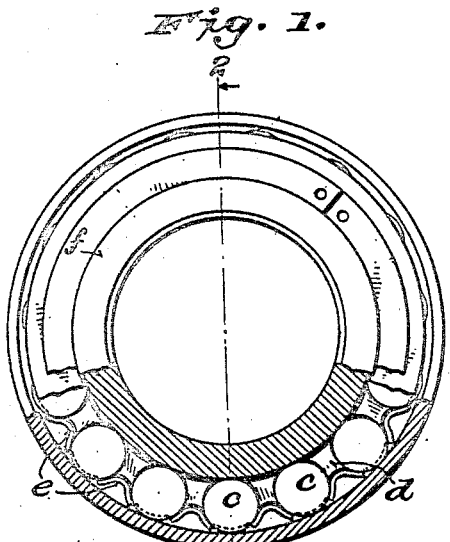
Figure 2:
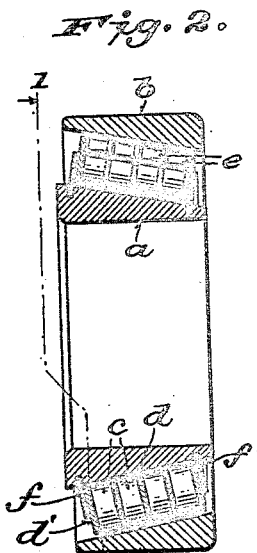
Figure 3:
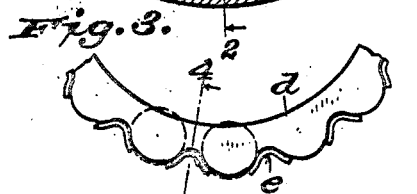
Figure 4:
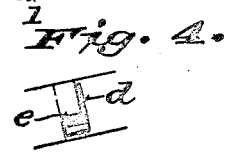
Figure 5:
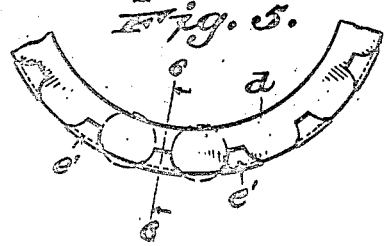
Figure 6:
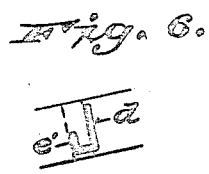
Figure 7:
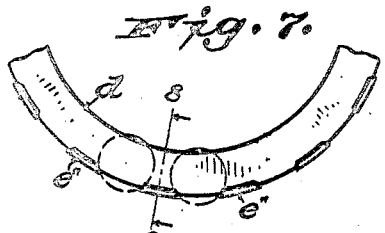
Figure 8:
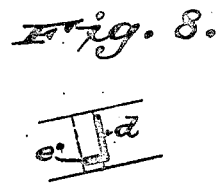

Figure 1 is a partial end elevation and partial section on the line 1—1, Fig. 2, of a roller bearing embodying the invention; Fig. 2 is an axial section of the bearing on the line 2—2, Fig. 1; Fig. 3 is a side elevation of a portion of a cage or spacing ring forming a part of the bearing; Fig. 4 is a cross section on the line 4—4, Fig. 3; Fig. 5 is a view similar to Fig. 3, of a portion of a cage or spacing ring of modified construction; Fig. 6 is a cross section on the line 6—6, Fig. 5; Fig. 7 is a view similar to Figs. 3 and 5, of a portion of another modified form of cage or spacing ring; and Fig. 8 is a cross section on the line 8—8, Fig. 7.

The bearing comprises inner and outer concentric annular bearing members $a$ and $b$, having opposing parallel conical bearing faces or faces having the same angle to the axis of the bearing.

Between the members $a$ and $b$ are interposed a number of independently rotatable annular series of narrow faced cylindrical rollers $c$, all of the same diameter. The several independently rotatable series of rollers are loosely confined in place and separated from one another by cages or spacing rings $d$, which may be conveniently stamped in one piece from sheet metal. Each cage or ring $d$ is formed on one side only with projections $e$, preferably at or adjacent to the outer edge of the cage or ring, and of somewhat less width than the faces of the rollers with which they work. These projections are made on their inner sides to fit over the peripheries of the rollers on that side of the cage or ring and to space them from one another, as shown in Figs. 1 and 3, each projection engaging with two adjacent rollers.

The series of rollers at one end of the bearing, preferably that adjacent to the larger end of the inner bearing member $a$, is loosely confined in place on the outer side by a washer or plain ring $d'$, which has no lateral projections for spacing the individual rollers of the series, which are spaced from one another by the projections $e$ on the cage or ring $d$ between the outer series and the next series.

The several series of rollers with their cages or spacing rings are loosely confined endwise between the members $a$ and $b$ by split retaining rings $f$, which are sprung into and held in annular grooves formed in the bearing member $a$, as shown in Figs. 1 and 2. The several rings $d$, $d'$ and $f$ are slightly coned to correspond with the inclination of the bearing faces of the members $a$ and $b$ so as to stand perpendicular or at right angles thereto, as shown in Fig. 2.

By the construction of the rollers $c$ with comparatively narrow peripheries or bearing faces and arranging and confining them in independently rotatable annular series, as herein shown and described, the rollers in the different series are not only permitted to rotate on their individual axes at different speeds according to the varying diameters of their paths on the members $a$ and $b$, but the rollers of each annular series with their cage or spacing ring are also permitted to advance bodily faster or slower than the rollers and cages of adjoining series according to the varying ratios between the diameters of the paths described by the rollers of the different series and according to whether the inner or the outer bearing member $a$ or $b$ is rotated.

When the inner bearing member $a$ is turned, the rollers in the series of larger diameter, with their cages or spacing rings, advance faster than the rollers in the series of smaller diameter with their cages; but when the outer bearing member b is turned, the rollers in the series of larger diameter with their cages, advance slower than the rollers in the series of smaller diameter with their cages. In both cases however, the rollers in the series of larger diameter rotate on their individual axes faster than those in the series of smaller diameter. The slippage, friction and wear incident to the operation of comparatively long cylindrical rollers between coaxial conical bearings of the same angle to their common axis, are thus avoided or materially reduced.

By the employment of cylindrical rollers series of rollers from one another with single comparatively thin spacing rings each having projections on one side only for spacing the individual rollers of each series from one another, the several series are brought close together, the bearing is made more compact and its construction is simplified.

By the employment of cylindrical rollers working with conical bearing members, the tendency to endwise displacement of the rollers is avoided.

The parts of a bearing constructed as herein shown and described, are easily assembled or taken apart. To assemble the parts of the bearing, the cages or spacing rings d, beginning with the smallest, are placed in position with their projections e uppermost, and filled or supplied with rollers c one after another, till all the series are assembled, with the washer or plain ring d' on top. The inner member a, with a retaining ring f in the groove in its larger end, is then inserted in place within the assembled cages and rollers and inverted with the rollers and cages thereon and finally another retaining ring f is sprung into the groove in the smaller end of said member.

The rollers c and their cages d and retaining washer and rings d' and f thus constitute with the member a, a self-contained unit which may be removed from and replaced in the bearing bodily without releasing the rollers or disturbing their arrangement and without affecting the mounting or adjustment of the other member b.

For resisting end thrust in both directions, as in vehicle wheels, two of these bearings are assembled with their conical faces inclined in opposite directions, preferably with the smaller ends of the members toward each other.

The lateral projections on the cages or spacing rings d may be made in different ways and of different forms. For example, as shown in Figs. 5 and 6, they may be made in the form of angular flanges e' of less width than the rollers c and having curved inwardly projecting edges conforming circumferentially to the peripheries of the rollers, or as shown in Figs. 7 and 8, they may be made in the form of plain flanges e'' adapted to extend transversely part way across the peripheries of the rollers confined between them.

Various modifications in the minor details of construction and arrangement of parts of the bearing other than those hereinbefore mentioned, may be made, without affecting the essential principle of the device and within the scope of the invention as defined in the following claims.

I claim:

1. In a roller bearing, the combination of coaxial members having opposing conical bearing faces at the same angle to their common axis and a number of independently rotatable rings each carrying a series of independently rotatable rollers, said rings and rollers being interposed between said members, and the carrying ring of one series of rollers abutting the sides of the rollers of the adjoining ring.

2. In a roller bearing, the combination of coaxial members having opposite conical bearing faces at the same angle to their common axis, and a number of independently rotatable coned rings each carrying a series of independently rotatable rollers, said rings and rollers being interposed between said members, and each ring abutting the sides of the rollers of the adjoining ring and having projections on one side for spacing its individual rollers from one another.

3. In a roller bearing, the combination of coaxial members having opposite conical bearing faces at the same angle to their common axis, a number of independently rotatable rings each carrying a series of independently rotatable rollers, said rings and rollers being interposed between said members, the carrying ring of one series of rollers abutting the side faces of the rollers of the adjoining ring, and a plain washer to hold the rollers at one of the outer rings in place against said ring.

4. In a roller bearing, the combination with a member having a conical bearing face, a number of independently rotatable rings each carrying a series of independently rotatable rollers and mounted on said member, the carrying ring of one series of rollers abutting the side faces of the rollers of an adjoining ring, a plain washer to hold the rollers at one of the outer rings in place against said ring, and split rings fitting in grooves formed in the conical faced member to hold the series of rings and rollers thereto.

5. In a roller bearing, the combination with a supporting member, of a number of independently rotatable rings mounted upon said member and each carrying a series of independently rotatable rollers, each ring having projections on one side for spacing its individual rollers from one another, and the carrying ring of one series of rollers abutting the side faces of the rollers of the adjoining ring.

In witness whereof I hereto affix my signature in presence of two witnesses.

REUBEN S. SMITH.

Witnesses:
CHAS. L. GOSS,
FRED PALM.

Copies of this patent may be obtained for five cents each, by addressing the "Commissioner of Patents, Washington, D. C."